United States Patent [19]

Choi

[11] Patent Number: 5,637,517
[45] Date of Patent: Jun. 10, 1997

[54] METHOD FOR FORMING ARRAY OF THIN FILM ACTUATED MIRRORS

[75] Inventor: Young-Jun Choi, Seoul, Rep. of Korea

[73] Assignee: Daewoo Electronics Co., Ltd., Seoul, Rep. of Korea

[21] Appl. No.: 639,575

[22] Filed: Apr. 29, 1996

[30] Foreign Application Priority Data

May 26, 1995 [KR] Rep. of Korea ............... 95-13352
May 26, 1995 [KR] Rep. of Korea ............... 95-13353

[51] Int. Cl.⁶ ............................................. H01L 21/265
[52] U.S. Cl. .................................. 438/29; 216/24
[58] Field of Search ........................... 437/40, 50, 51

[56] References Cited

U.S. PATENT DOCUMENTS

| | | | |
|---|---|---|---|
| 4,259,779 | 4/1981 | Ipri et al. | 437/41 TF |
| 4,263,057 | 4/1981 | Ipri | 437/41 TF |
| 4,692,994 | 9/1987 | Moniwa et al. | 437/40 TF |
| 5,481,396 | 1/1996 | Ji et al. | 359/295 |
| 5,541,679 | 7/1996 | Yang | 353/98 |
| 5,550,066 | 8/1996 | Tang et al. | 437/40 TF |
| 5,550,680 | 8/1996 | Yoon | 359/850 |

*Primary Examiner*—John Niebling
*Assistant Examiner*—Michael S. Lebentritt
*Attorney, Agent, or Firm*—Anderson Kill & Olick P.C.

[57] ABSTRACT

An inventive method for the manufacture of an array of M×N thin film actuated mirrors includes the steps of: providing an active matrix; forming a thin film sacrificial layer; depositing an elastic layer; forming an array of M×N conduits in the elastic layer; depositing a second thin film, a thin film electrodisplacive, a first thin film layers on top of the elastic layer, successively; patterning the first thin film, the thin film electrodisplacive and the second thin film layers into an array of M×N first thin film electrodes, an array of M×N thin film electrodisplacive members and an array of M×N second thin film electrodes, respectively, thereby forming an array of M×N semi-actuated mirror structures; patterning the elastic layer into M number of pseudo elastic members, each of the M number of pseudo elastic members having N number of bridge-shaped portions; forming a thin film protection layer completely covering the semiactuated mirror structures; removing the thin film sacrificial layer; removing the thin film protection layer; and patterning the M number of pseudo elastic members into an array of M×N elastic members, thereby forming the array of M×N thin film actuated mirrors.

9 Claims, 9 Drawing Sheets

5,637,517

METHOD FOR FORMING ARRAY OF THIN FILM ACTUATED MIRRORS

FIELD OF THE INVENTION

The present invention relates to an optical projection system; and, more particularly, to a method for the manufacture of an array of M×N thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Ser. No. 08/430,628, entitled "THIN FILM ACTUATED MIRROR ARRAY".

The process for manufacturing the array 100 begins with the preparation of an active matrix 10 having a top surface and comprising a substrate 12, an array of M×N transistors (not shown) and an array of M×N connecting terminals 14.

In a subsequent step, there is formed on the top surface of the active matrix 10 a thin film sacrificial layer 24 by using a sputtering or an evaporation method if the thin film sacrificial layer 24 is made of a metal, a chemical vapor deposition (CVD) or a spin coating method if the thin film sacrificial layer 24 is made of a phosphor-silicate glass (PSG), or a CVD method if the thin film sacrificial layer 24 is made of a poly-Si.

Thereafter, there is formed a supporting layer 20 including an array of M×N supporting members 22 surrounded by the thin film sacrificial layer 24, wherein the supporting layer 20 is formed by: creating an array of M×N empty slots (not shown) on the thin film sacrificial layer 24 by using a photolithography method, each of the empty slots being located around the connecting terminals 14; and forming a supporting member 22 in each of the empty slots located around the connecting terminals 14 by using a sputtering or a CVD method, as shown in FIG. 1A. The supporting members 22 are made of an insulating material.

In a following step, an elastic layer 30 made of the same insulating material as the supporting members 22 is formed on top of the supporting layer 20 by using a Sol-Gel, a sputtering or a CVD method.

Subsequently, a conduit 26 made of a metal is formed in each of the supporting members 22 by: first creating an array of M×N holes (not shown), each of the holes extending from top of the elastic layer 30 to top of the connecting terminals 14, by using an etching method; and filling therein with the metal to thereby form the conduit 26, as shown in FIG. 1B.

In a next step, a second thin film layer 40 made of an electrically conducting material is formed on top of the elastic layer 30 including the conduits 26 by using a sputtering method. The second thin film layer 40 is electrically connected to the transistors through the conduits 26 formed in the supporting members 22.

Then, a thin film electrodisplacive layer 50 made of a piezoelectric material, e.g., lead zirconium titanate (PZT), is formed on top of the second thin film layer 40 by using a sputtering method, a CVD method or a Sol-Gel method, as shown in FIG. 1C.

In an ensuing step, the thin film electrodisplacive layer 50, the second thin film layer 40 and the elastic layer 30 are patterned into an array of M×N thin film electrodisplacive members 55, an array of M×N second thin film electrodes 45 and an array of M×N elastic members 35 by using a photolithography or a laser trimming method until the supporting layer 20 is exposed, as shown in FIG. 1D. Each of the second thin film electrodes 45 is electrically connected to the transistor through the conduit 26 formed in each of the supporting members 22 and functions as a signal electrode in the thin film actuated mirrors 101.

Next, each of the thin film electrodisplacive members 55 is heat treated at a high temperature, e.g., for PZT, around 650° C., to allow a phase transition to take place to thereby form an array of M×N heat treated structures (not shown). Since each of the heat treated thin film electrodisplacive members 55 is sufficiently thin, there is no need to pole it in case it is made of a piezoelectric material: for it can be poled with the electric signal applied during the operation of the thin film actuated mirrors 101.

After the above step, an array of M×N first thin film electrodes 65 made of an electrically conducting and light reflecting material is formed on top of the thin film electrodisplacive members 55 in the array of M×N heat treated structures by first forming a layer 60, made of the electrically conducting and light reflecting material, completely covering top of the array of M×N heat treated structures, including the exposed supporting layer 20, using a sputtering method, as shown in FIG. 1E, and then selectively removing the layer 60, using an etching method, resulting in an array 110 of M×N actuated mirror structures 111, wherein each of the actuated mirror structures 111 includes a top surface and four side surfaces, as shown in FIG. 1F. Each of the first thin film electrodes 65 functions as a mirror as well as a bias electrode in the thin film actuated mirrors 101.

The preceeding step is then followed by completely covering the top surface and the four side surfaces in each of the actuated mirror structures 111 with a thin film protection layer (not shown).

The thin film sacrificial layer 24 in the supporting layer 20 is then removed by using an wet etching method. Finally, the thin film protection layer is removed to thereby form the array 100 of M×N thin film actuated mirrors 101, as shown in FIG. 1G.

There are certain deficiencies associated with the above described method for manufacturing the array 100 of M×N thin film actuated mirrors 101. The first and foremost occurs during the removal of an etchant used in removing the thin film sacrificial layer 24 and the thin film protection layer.

The etchant is removed by using a rinse which, in turn, is removed by the evaporation thereof. However, during the removal of the rinse, the surface tension of the rinse may pull the elastic member 35 down toward the active matrix 10, resulting in the elastic member 35 sticking to the active matrix 10. This may degrade the structural integrity and the performance of the thin film actuated mirrors 101, which, in turn, may degrade the overall performance of the array 100.

SUMMARY OF THE INVENTION

It is, therefore, a primary object of the present invention to provide a method for the manufacture of an array of M×N thin film actuated mirrors for use in an optical projection system capable of preventing the elastic member from sticking to the active matrix during the removal of the rinse.

In accordance with one aspect of the present invention, there is provided a method for the manufacture of an array of M×N thin film actuated mirrors, wherein M and N are integers, for use in an optical projection system, the method comprising the steps of: providing an active matrix including a substrate, an array of M×N connecting terminals and an array of M×N transistors, wherein each of the connecting terminals is electrically connected to a corresponding transistor in the array of transistors; depositing a thin film sacrificial layer on top of the active matrix; creating an array of M×N empty slots in the thin film sacrificial layer, each of the empty slots being located around top of the connecting terminals; depositing an elastic layer, made of an insulating material, on top of the thin film sacrificial layer while filling the empty slots; forming an array of M×N conduits in the elastic layer, each of the conduits extending from top of the elastic layer to top of a corresponding connecting terminal; depositing a second thin film, a thin film electrodisplacive and a first thin film layers on top of the elastic layer including the conduits, wherein the second thin film layer is made of an electrically conducting material, and the first thin film layer is made of an electrically conducting and light reflecting material; patterning the first thin film, the thin film electrodisplacive and the second thin film layers into an array of M×N first thin film electrodes, an array of M×N thin film electrodisplacive members and an array of M×N second thin film electrodes, respectively, until the elastic layer is exposed, thereby forming an array of M×N semiactuated mirror structures, each of the semi-actuated mirror structures including the first thin film electrode, the thin film electrodisplacive member and the second thin film electrode, wherein the second thin film electrode is electrically connected to a corresponding transistor through the conduit and the connecting terminal, thereby functioning as a signal electrode in each of the thin film actuated mirrors, and the first thin film electrode functions as a mirror and a bias electrode in each of the thin film actuated mirrors; patterning the elastic layer, in a columnar direction, into M number of pseudo elastic members, until the thin film sacrificial layer is exposed, each of the M number of pseudo elastic members having N number of bridge-shaped portions; forming a thin film protection layer completely covering each of the semi-actuated mirror structures; removing the thin film sacrificial layer thereby forming driving spaces; removing the thin film protection layer; and patterning the M number of pseudo elastic members, in a row direction, into an array of M×N elastic members, thereby forming the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1A:
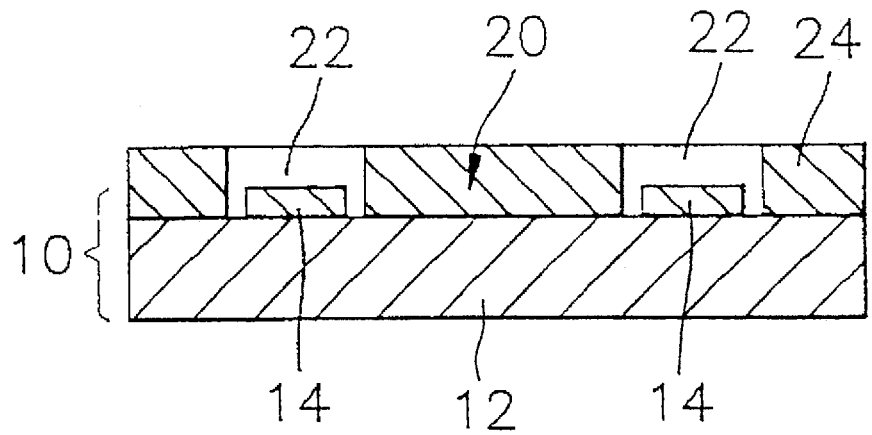
FIGS. 1A to 1G are schematic cross sectional views illustrating a method for the manufacture of an array of M×N thin film actuated mirrors previously disclosed.
Figure 1B:
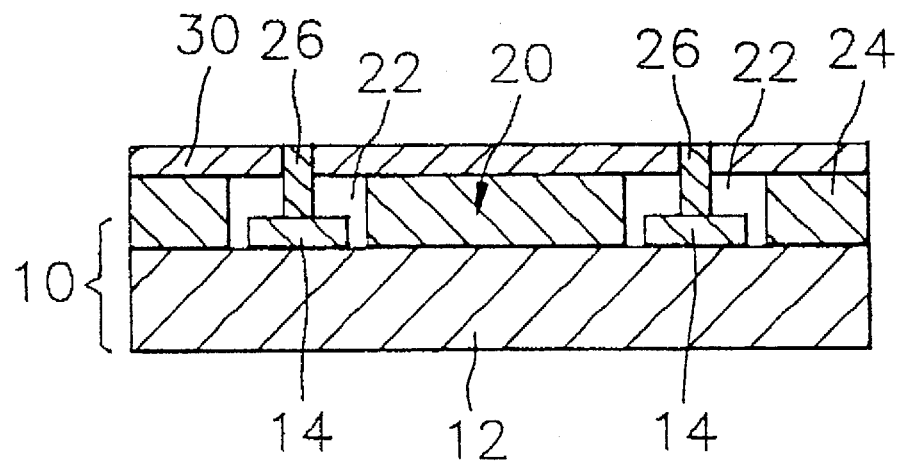
Figure 1C:
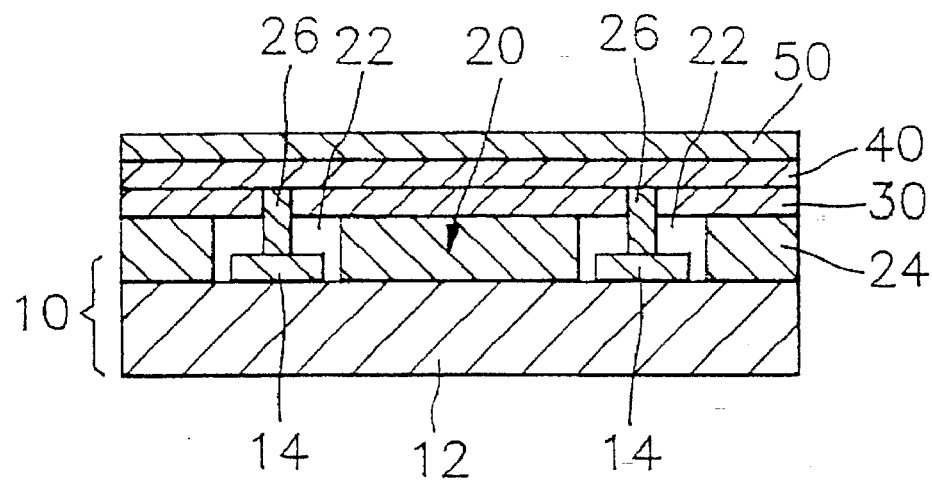
Figure 1D:
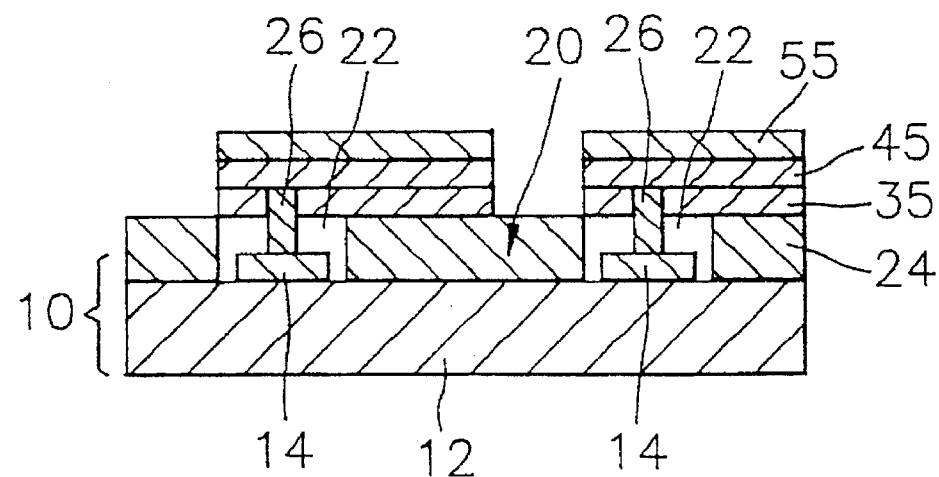
Figure 1E:
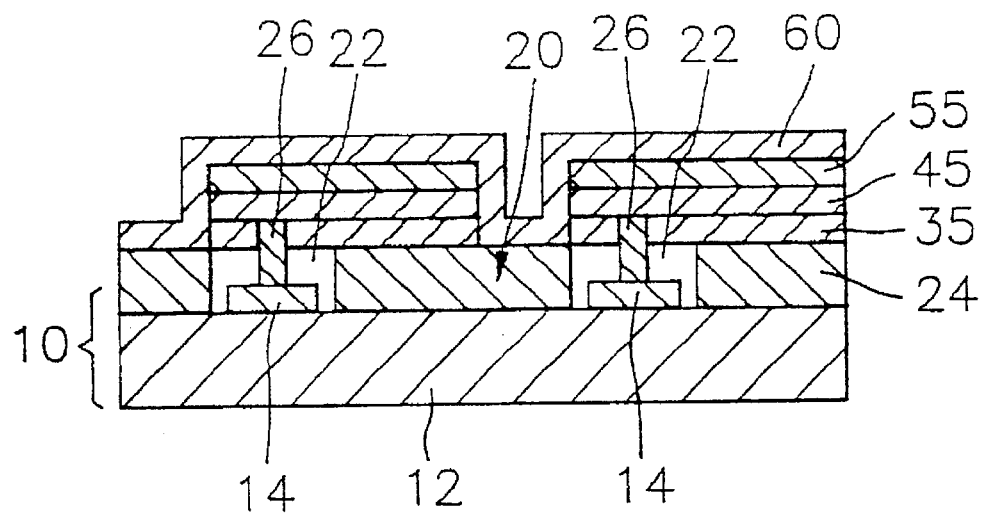
Figure 1F:
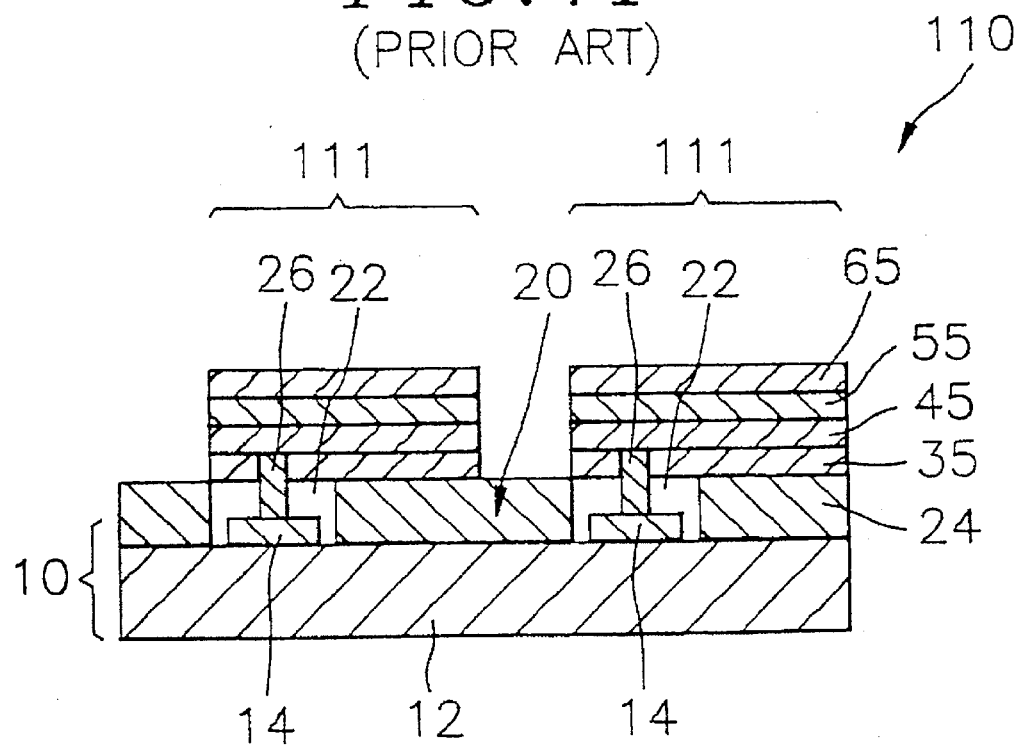
Figure 1G:
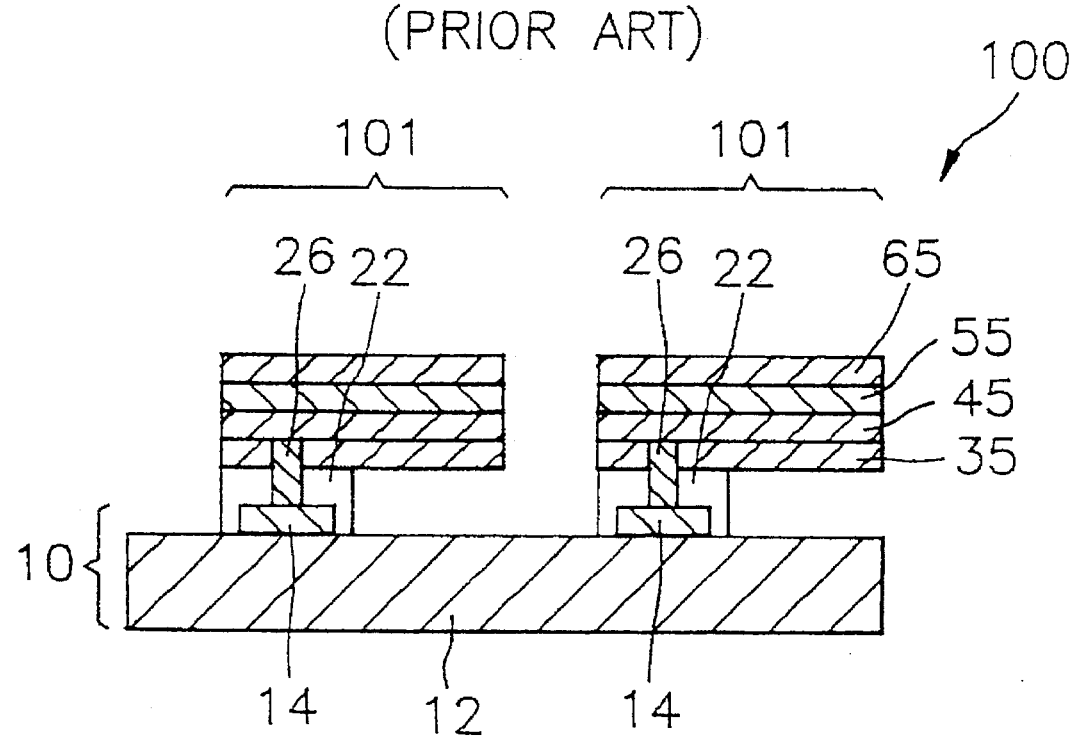

There are provided in FIGS. 2A to 2F and 3A to 3D schematic cross sectional views setting forth methods for the manufacture of an array 300 of M×N thin film actuated mirrors 301, wherein M and N are integers, for use in an optical projection system in accordance with the present invention, respectively. It should be noted that like parts appearing in FIGS. 2A to 2F and 3A to 3D are represented by like reference numerals.

In FIGS. 2A to 2F, there are presented schematic cross sectional views setting forth a method for the manufacture of an array 300 of M×N thin film actuated mirrors 301 in accordance with one embodiment of the present invention.

The process for the manufacture of the array 300 begins with the preparation of an active matrix 210 including a substrate 212, an array of M×N connecting terminals 214 and an array of M×N transistors (not shown), wherein each of the connecting terminals 214 is electrically connected to a corresponding transistor in the array of transistors.

In a subsequent step, there is formed on top of the active matrix 210 a thin film sacrificial layer 224, having a thickness of 0.1–2 μm, and made of a metal, e.g., copper (Cu) or nickel (Ni), a phosphor-silicate glass (PSG) or a poly-Si. The thin film sacrificial layer 224 is formed by using a sputtering or an evaporation method if the thin film sacrificial layer 224 is made of a metal, a chemical vapor deposition (CVD) method or a spin coating method if the thin film sacrificial layer 224 is made of a PSG, or a CVD method if the thin film sacrificial layer 224 is made of a poly-Si.

Thereafter, there is formed an array of M×N empty slots (not shown) in the thin film sacrificial layer 224 by using a photolithography method. Each of the empty slots is located around top of the connecting terminals 214.

Subsequently, an elastic layer 230, made of an insulating material, e.g., silicon nitride, and having a thickness of 0.1–2 μm, is deposited on top of the thin film sacrificial layer 224 while filling the empty slots by using an evaporation method, a sputtering method or a CVD method.

Figure 2A:
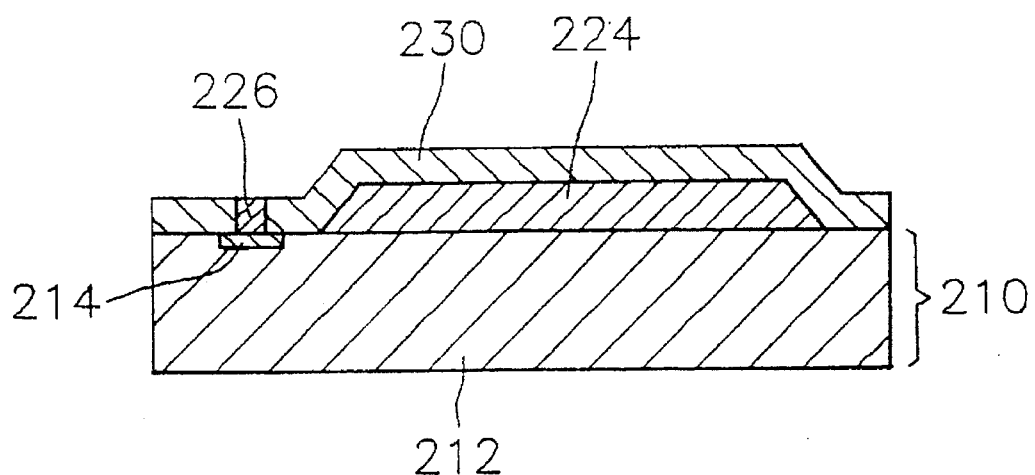
FIGS. 2A to 2F are schematic cross sectional views setting forth a method for the manufacture of an array of M×N thin film actuated mirrors in accordance with one embodiment of the present invention.

Thereafter, there is formed in the elastic layer 230 an array of M×N conduits 226 made of a metal, e.g., aluminum (Al) or tungsten (W). Each of the conduits 226 is formed by: first creating an array of M×N holes (not shown), each of the holes extending from top of the elastic layer 230 to top of a corresponding connecting terminal 214 by using an etching method; and filling therein with the metal by using a sputtering method or a CVD method, as shown in FIG. 2A.

Then, a second thin film layer 240, made of an electrically conducting material, e.g., platinum (Pt) or platinum/titanium (Pt/Ti), and having a thickness of 0.1–2 μm, is formed on top of the elastic layer 230 including the conduits 226 by using a sputtering or a vacuum evaporation method.

Next, a thin film electrodisplacive layer 250, made of a piezoelectric material, e.g., lead zirconiuor an electrostrictor an electrostrictive material, e.g., lead magnesium niobate (PMN), and having a thickness of 0.1–2 μm, is formed on top of the second thin film layer 240 by using an evaporation method, a sputtering method or a Sol-Gel method. The thin film electrodisplacive layer 250 is then heat treated to allow a phase transition to take place.

Figure 2B:
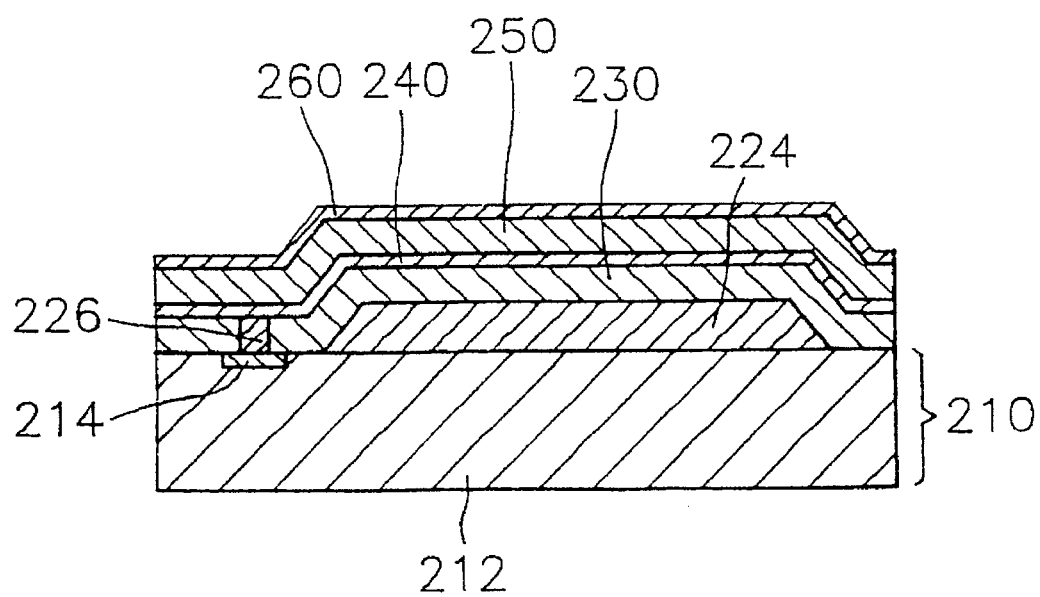

In an ensuing step, a first thin film layer 260, made of an electrically conducting and light reflecting material, e.g., aluminum (Al) or silver (Ag), and having a thickness of 0.1–2 μm, is formed on top of the thin film electrodisplacive layer 250 by using a sputtering or a vacuum evaporation method, as shown in FIG. 2B.

After the above step, the first thin film 260, the thin film electrodisplacive 250 and the second thin film layers 240 are patterned into an array of M×N first thin film electrodes 265, an array of M×N thin film electrodisplacive members 255 and an array of M×N second thin film electrodes 245, respectively, until the elastic layer 230 is exposed, by using a photolithography or a laser trimming method, thereby forming an array of M×N semi-actuated mirror structures 321. Each of the semi-actuated mirror structures 321 includes the first thin film electrode 265, the thin film electrodisplacive member 255 and the second thin film electrode 245. The second thin film electrode 245 is electrically connected to a corresponding transistor through the conduit 226 and the connecting terminal 214, thereby functioning as a signal electrode in each of the thin film actuated mirrors 301. The first thin film electrode 265 functions as a mirror as well as a bias electrode in each of the thin film actuated mirrors 301.

Since the thin film electrodisplacive member 255 is sufficiently thin, there is no need to pole it in case it is made of a piezoelectric material: for it can be poled with the electric signal applied during the operation of the thin film actuated mirrors 301.

Figure 2C:
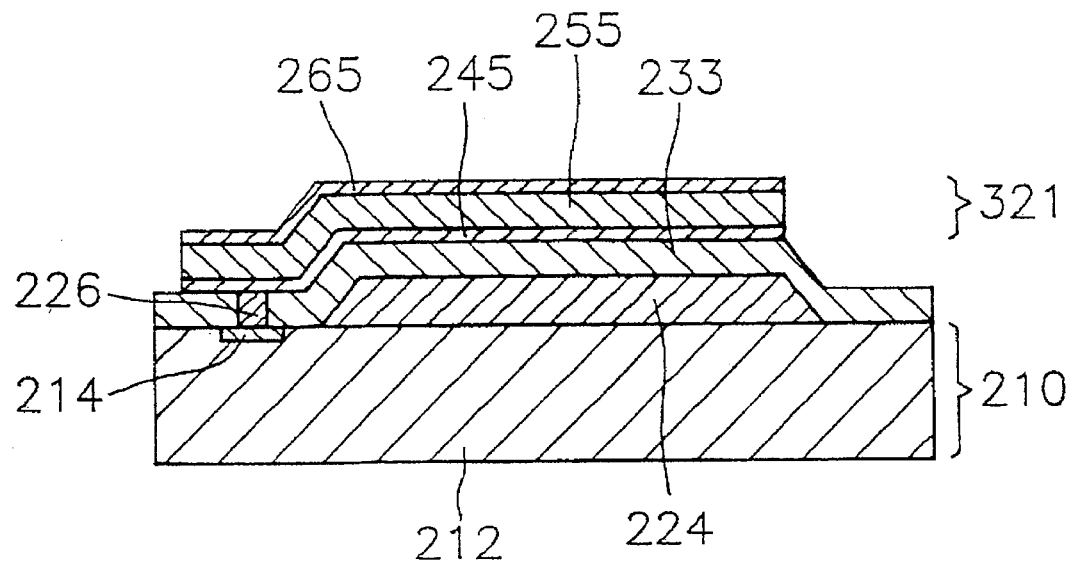

In a following step, the elastic layer 230 is patterned, in a columnar direction, into M number of pseudo elastic members 233, until the thin film sacrificial layer 224 is exposed, by using a photolithography or a laser trimming method, as shown in FIG. 2C. Each of the M number of pseudo elastic members 233 has N number of bridge-shaped portions.

Figure 2D:
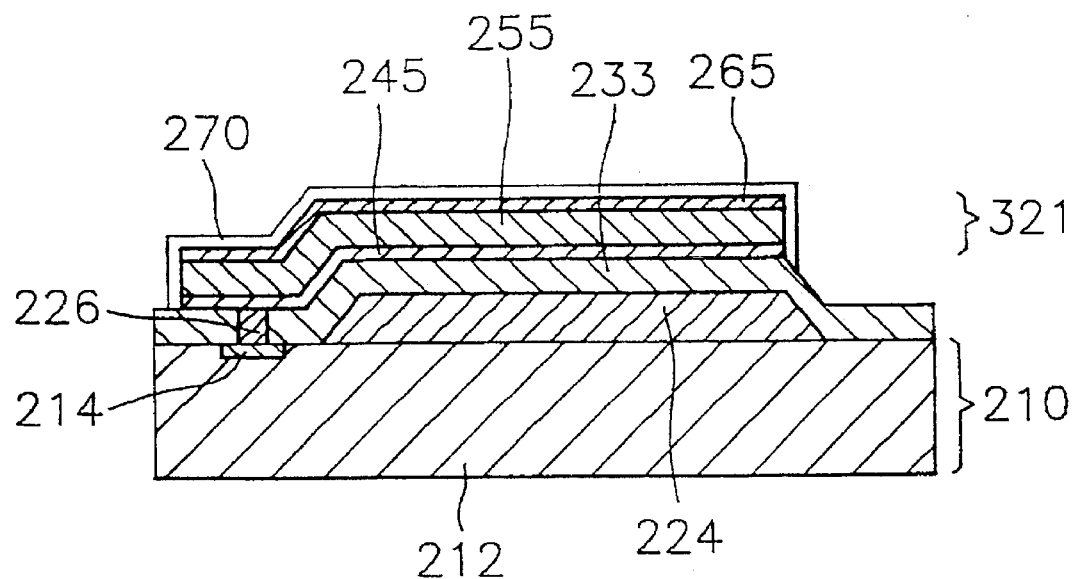

The preceeding step is then followed by completely covering each of the semi-actuated mirror structures 321 with a thin film protection layer 270, as shown in FIG. 2D.

The thin film sacrificial layer 224 is then removed by using an etchant or a chemical, thereby forming driving spaces 280. The etchant or the chemical used in the removal of the thin film sacrificial layer 224 is rinsed away by using a rinse, and then the rinse is removed.

Figure 2E:
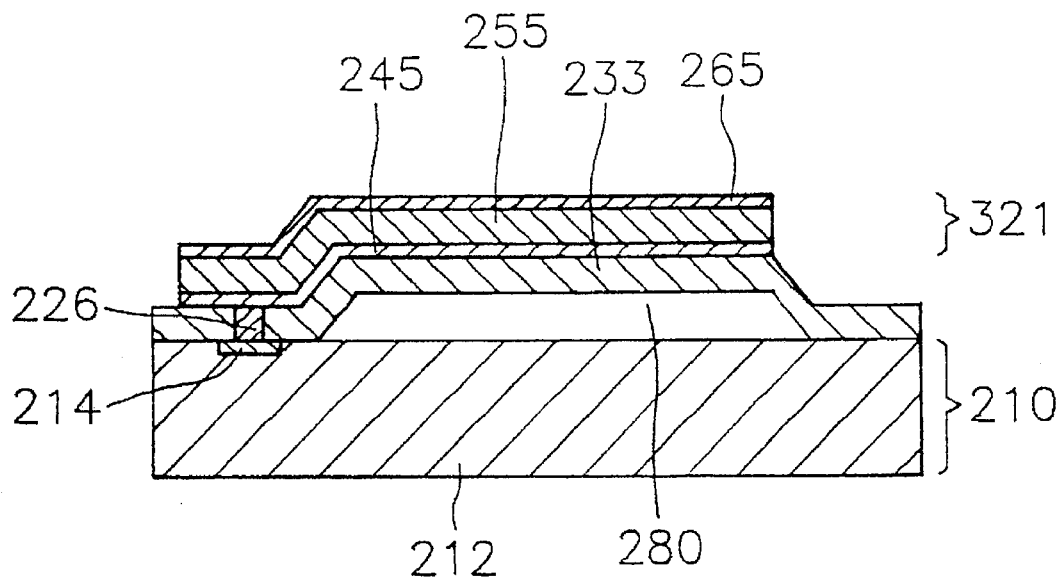

In an ensuing step, the thin film protection layer 270 is removed by using a chemical, as shown in FIG. 2E. The chemical used in the removal of the thin film protection layer 270 is rinsed away by using a rinse, and then the rinse is removed.

Figure 2F:
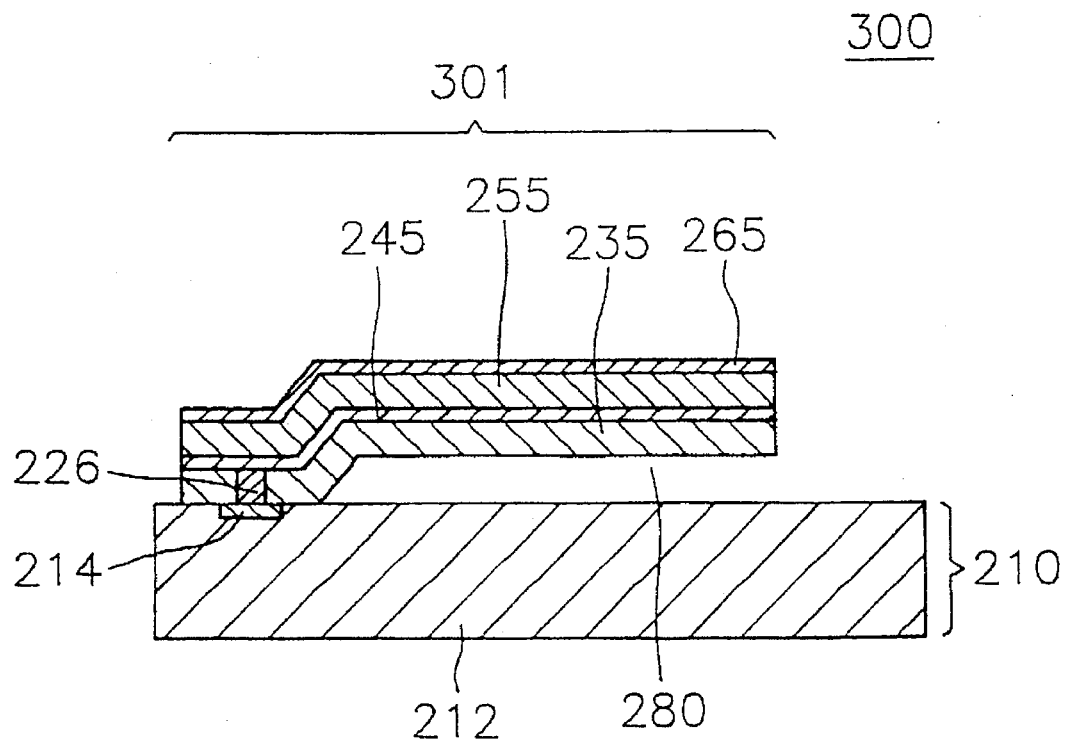

Finally, the M number of pseudo elastic members 233 are patterned, in a row direction, into an array of M×N elastic members 235 by using an etching method, e.g., reaction ion etching method, thereby forming the array 300 of M×N thin film actuated mirrors 301, as shown in FIG. 2F.

In contrast with the method for the manufacture of the array 100 of M×N thin film actuated mirrors 101, in the inventive method, since during the removal of the rinse, the semi-actuated mirror structures 321 are supported by the M number of pseudo elastic members 233, each of the M number of pseudo elastic members 233 having the N number of bridge-shaped portions, the elastic members 235 are prevented from sticking to the active matrix 210 by the surface tension of the rinse, increasing the structural integrity and the performance of the thin film actuated mirrors 301, which will, in turn, increase the overall performance of the array 300.

In FIGS. 3A to 3D, there are provided schematic cross sectional views setting forth a method for the manufacture of the array 300 of M×N thin film actuated mirrors 301 in accordance with another embodiment of the present invention.

Figure 3A:
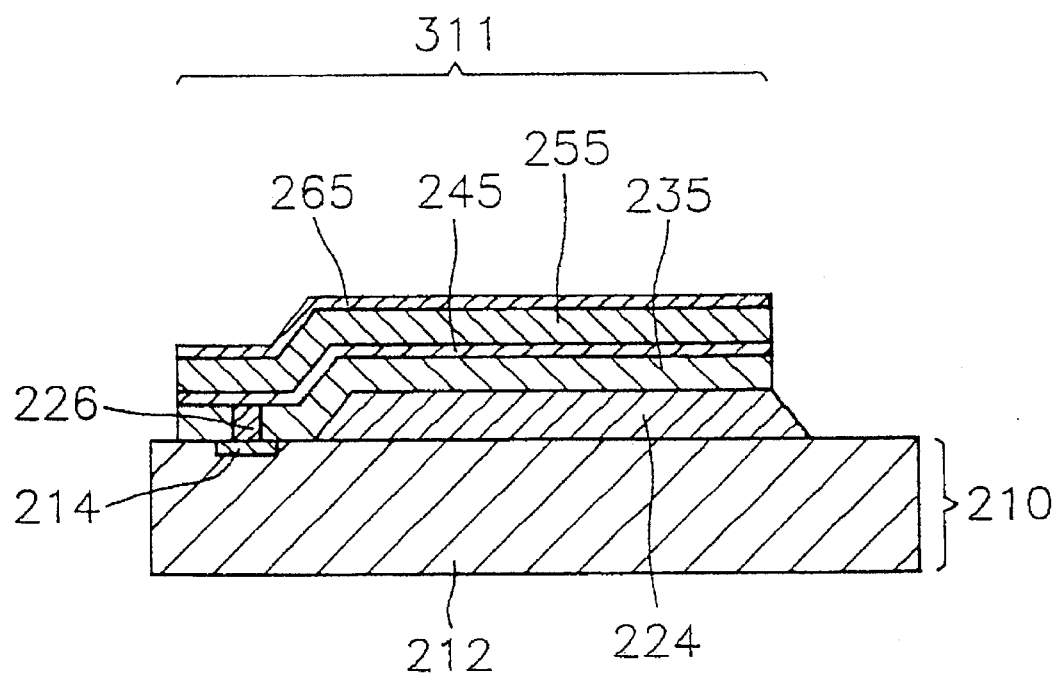
FIGS. 3A to 3D are schematic cross sectional views setting forth a method for the manufacture of an array of M×N thin film actuated mirrors in accordance with another embodiment of the present invention.

After the deposition of the first thin film layer 260, as shown in FIG. 2B, the first thin film 260, the thin film electrodisplacive 250, the second thin film 240 and the elastic layers 230 are patterned into an array of M×N first thin film electrodes 265, an array of M×N thin film electrodisplacive members 255, an array of M×N second thin film electrodes 245 and an array of M×N elastic members 235, respectively, until portions of the thin film sacrificial layer 224 and the active matrix 210 are exposed, by using a photolithography or a laser trimming method, thereby forming an array 310 of M×N actuated mirror structures 311, as shown in FIG. 3A.

The preceeding step is then followed by completely covering the actuated mirror structures 311 including the exposed portions of the thin film sacrificial layer 224 and the active matrix 210 with a thin film protection layer (not shown) made of a photoresist.

Figure 3B:
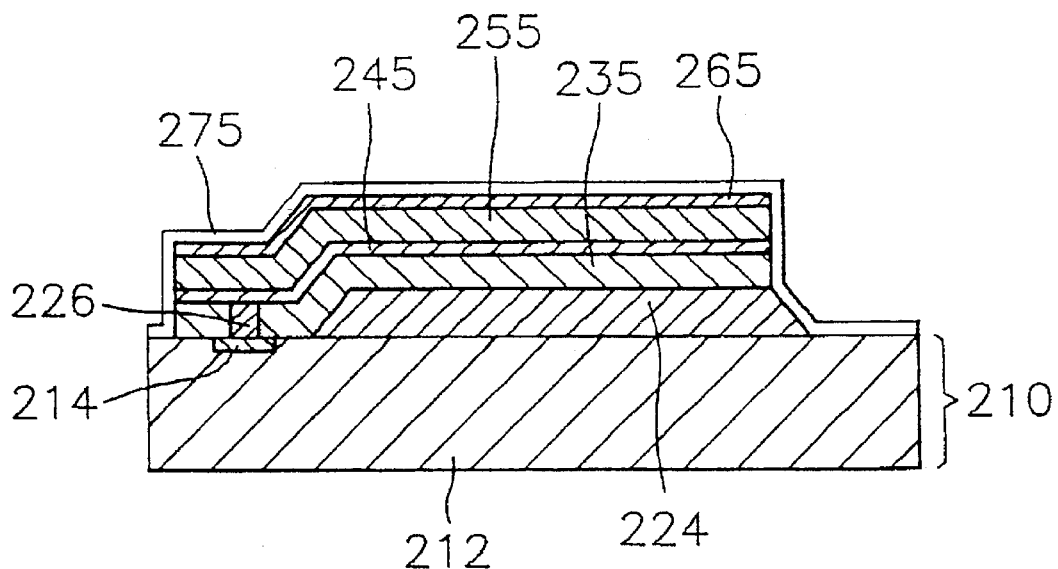

In a following step, the thin film protection layer is patterned, in a columnar direction, into M number of pseudo thin film protection members 275, until the thin film sacrificial layer 224 is exposed, by using a photolithography method, as shown in FIG. 3B.

Figure 3C:
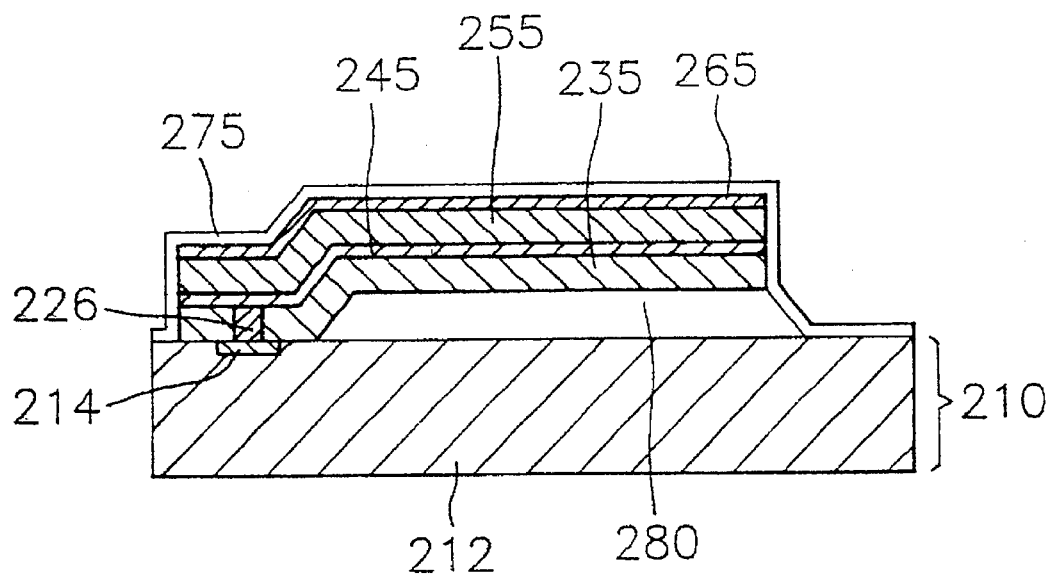

The thin film sacrificial layer 224 is then removed by using an etchant or a chemical, thereby forming driving spaces 280, as shown in FIG. 3C. The etchant or the chemical used in the removal of the thin film sacrificial layer 224 is rinsed away by using a rinse, and then the rinse is removed.

Figure 3D:
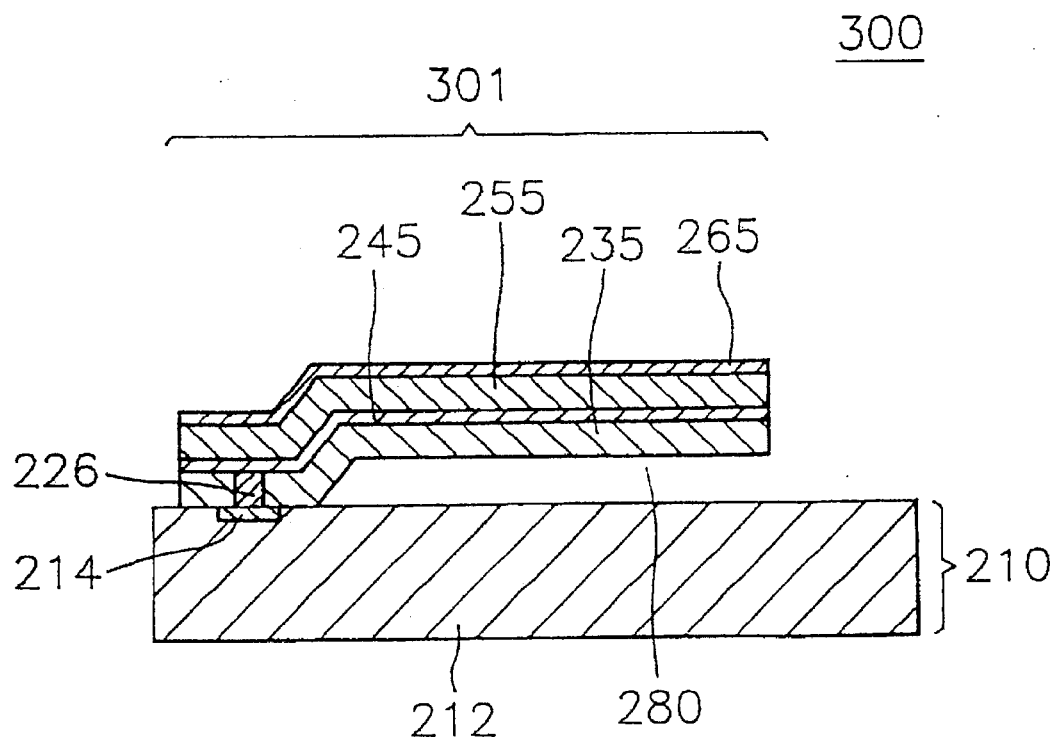

In an ensuing step, the M number of pseudo thin film protection members 275 are removed by burning away or by using an etching method, e.g., plasma etching method, thereby forming the array 300 of M×N thin film actuated mirrors 301, as shown in FIG. 3D.

In the above mentioned method for the manufacture of the array 300 of M×N thin film actuated mirrors 301, since during the removal of the rinse, the actuated mirror structures 311 are stabilized by the M number of pseudo thin film protection members 275, the elastic members 235 are prevented from sticking to the active matrix 210, increasing the structural integrity and the performance of the thin film actuated mirrors 301, which will, in turn, increase the overall performance of the array 300.

While the present invention has been described with respect to certain preferred embodiments only, other modifications and variations may be made without departing from the scope of the present invention as set forth in the following claims.

What is claimed is:

1. A method for the manufacture of an array of M×N thin film actuated mirrors, wherein M and N are integers, for use in an optical projection system, the method comprising the steps of:

providing an active matrix including a substrate, an array of M×N connecting terminals and an array of M×N transistors, wherein each of the connecting terminals is electrically connected to a corresponding transistor in the array of transistors;

depositing a thin film sacrificial layer on top of the active matrix;

creating an array of M×N empty slots in the thin film sacrificial layer, each of the empty slots being located around the top of the connecting terminals;

depositing an elastic layer, made of an insulating material, on top of the thin film sacrificial layer while filling the empty slots;

forming an array of M×N conduits in the elastic layer, each of the conduits extending from the top of the elastic layer to the top of a corresponding connecting terminal;

depositing a second thin film, a thin film electrodisplacive and a first thin film layers on top of the elastic layer including the conduits, wherein the second thin film layer is made of an electrically conducting material, and the first thin film layer is made of an electrically conducting and light reflecting material;

patterning the first thin film, the thin film electrodisplacive and the second thin film layers into an array of M×N first thin film electrodes, an array of M×N thin film electrodisplacive members and an array of M×N second thin film electrodes, respectively, until the elastic layer is exposed, thereby forming an array of M×N semi-actuated mirror'structures, each of the semi-actuated mirror structures including the first thin film electrode, the thin film electrodisplacive member and the second thin film electrode, wherein the second thin film electrode is electrically connected to a corresponding transistor through the conduit and the connecting terminal, thereby functioning as a signal electrode in each of the thin film actuated mirrors, and the first thin film electrode functions as a mirror and a bias electrode in each of the thin film actuated mirrors;

patterning the elastic layer, in a columnar direction, into M number of pseudo elastic members, until the thin film sacrificial layer is exposed, each of the M number of pseudo elastic members having N number of bridge-shaped portions;

forming a thin film protection layer completely covering each of the semi-actuated mirror structures;

removing the thin film sacrificial layer thereby forming driving spaces;

removing the thin film protection layer; and patterning the M number of pseudo elastic members, in a row direction, into an array of M×N elastic members, thereby forming the array of M×N thin film actuated mirrors.

2. The method of claim 1, wherein the elastic layer is patterned into the M number of pseudo elastic members by using a photolithography method.

3. The method of claim 1, wherein the elastic layer is patterned into the M number of pseudo elastic members by using a laser trimming method.

4. The method of claims 2 or 3, wherein the M number of pseudo elastic members are patterned into the array of M×N elastic members by using a reaction ion etching method.

5. A method for the manufacture of an array of M×N thin film actuated mirrors, wherein M and N are integers, for use in an optical projection system, the method comprising the steps of:

providing an active matrix including a substrate, an array of M×N connecting terminals and an array of M×N transistors, wherein each of the connecting terminals is electrically connected to a corresponding transistor in the array of transistors;

depositing a thin film sacrificial layer on top of the active matrix;

creating an array of M×N empty slots in the thin film sacrificial layer, each of the empty slots being located around the top of the connecting terminals;

depositing an elastic layer, made of an insulating material, on top of the thin film sacrificial layer including the empty slots;

forming an array of M×N conduits in the elastic layer, each of the conduits extending from the top of the elastic layer to the top of a corresponding connecting terminal;

depositing a second thin film, a thin film electrodisplacive, a first thin film layers on top of the elastic layer including the conduits, wherein the second thin film layer is made of an electrically conducting material, and the first thin film layer is made of an electrically conducting and light reflecting material;

patterning the first thin film, the thin film electrodisplacive, the second thin film and the elastic layers into an array of M×N first thin film electrodes, an array of M×N thin film electrodisplacive members, an array of M×N second thin film electrodes and an array of M×N elastic members, respectively, until portions of the thin film sacrificial layer and the active matrix are exposed, thereby forming an array of M×N actuated mirror structures, each of the actuated mirror structures including the first thin film electrode, the thin film electrodisplacive member, the second thin film electrode and the elastic member, wherein the second thin film electrode is electrically connected to a corresponding transistor through the conduit and the connecting terminal, thereby functioning as a signal electrode in each of the thin film actuated mirrors, and the first thin film electrode functions as a mirror and a bias electrode in each of the thin film actuated mirrors;

forming a thin film protection layer completely covering the actuated mirror structures including the exposed portions of the thin film sacrificial layer and the active matrix;

patterning the thin film protection layer, in a columnar direction, into M number of pseudo thin film protection members, until the thin film sacrificial layer is exposed;

removing the thin film sacrificial layer, thereby forming driving spaces;

removing the M number of pseudo thin film protection members, thereby forming the array of M×N thin film actuated mirrors.

6. The method of claim 5, wherein the thin film protection layer is made of a photoresist.

7. The method of claim 5, wherein the thin film protection layer is patterned into the M number of pseudo thin film protection members by using a photolithography method.

8. The method of claim 5, wherein the M number of pseudo thin film protection members are removed by burning away.

9. The method of claim 5, wherein the M number of pseudo thin film protection members are removed by using a plasma etching method.

* * * * *